(12) United States Patent
Kamio

(10) Patent No.: US 12,220,990 B2
(45) Date of Patent: Feb. 11, 2025

(54) CONTROL APPARATUS FOR VEHICLE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 153 days.

(21) Appl. No.: 18/082,869

(22) Filed: Dec. 16, 2022

(65) Prior Publication Data

US 2023/0121809 A1    Apr. 20, 2023

Related U.S. Application Data

(63) Continuation of application No. PCT/JP2021/021857, filed on Jun. 9, 2021.

(30) Foreign Application Priority Data

Jun. 30, 2020    (JP) .................................. 2020-113140

(51) Int. Cl.
| | |
|---|---|
| *F16H 63/48* | (2006.01) |
| *B60K 20/02* | (2006.01) |
| *B60L 15/20* | (2006.01) |
| *B60T 7/12* | (2006.01) |
| *F16H 63/34* | (2006.01) |

(52) U.S. Cl.
CPC .......... *B60L 15/2054* (2013.01); *B60K 20/02* (2013.01); *B60L 15/2018* (2013.01); *B60L 15/2081* (2013.01); *B60T 7/12* (2013.01); *F16H 63/34* (2013.01); *F16H 63/48* (2013.01)

(58) Field of Classification Search
CPC ............... B60K 2001/001; F16H 63/34; F16H 63/3416; F16H 63/483; F16H 63/48; F16H 63/486; B60L 15/2018; B60T 7/12
See application file for complete search history.

(56) References Cited

U.S. PATENT DOCUMENTS

| | | | |
|---|---|---|---|
| 5,807,205 A | 9/1998 | Odaka et al. | |
| 2008/0086255 A1* | 4/2008 | Oshima | F16H 63/483 |
| | | | 701/101 |
| 2019/0381976 A1 | 12/2019 | Kamio | |

FOREIGN PATENT DOCUMENTS

| | | |
|---|---|---|
| JP | 2009-254162 A | 10/2009 |
| JP | 2009-280147 A | 12/2009 |
| JP | 2011-98706 A | 5/2011 |

(Continued)

*Primary Examiner* — Sherry L Estremsky
(74) *Attorney, Agent, or Firm* — Oliff PLC

(57) ABSTRACT

A control apparatus is mountable to a vehicle including an electric motor, a lock mechanism, and an actuator apparatus. The control apparatus controls the electric motor and a shift-by-wire system provided in the vehicle. The shift-by-wire system performs switching to shift ranges of the vehicle including a shift range and a non-parking range other than the parking range. The control apparatus drives the actuator apparatus to release the lock on the power transmission mechanism by the lock mechanism based on the shift range of the shift-by-wire system being switched from the parking range to the non-parking range. The control apparatus performs torque correction control in which an output torque of the electric motor is corrected such that a load acting on the lock mechanism from the power transmission mechanism is reduced based on the shift range of the shift-by-wire system being switched from the parking range to the non-parking range.

18 Claims, 10 Drawing Sheets

(56) References Cited

FOREIGN PATENT DOCUMENTS

| | | | |
|---|---|---|---|
| JP | 2013113434 A | * | 6/2013 |
| JP | 2017-82884 A | | 5/2017 |
| JP | 2018-62228 A | | 4/2018 |
| JP | 2018-114929 A | | 7/2018 |
| JP | 2018-122826 A | | 8/2018 |
| WO | 2017/169522 A1 | | 10/2017 |

* cited by examiner

CONTROL APPARATUS FOR VEHICLE

CROSS-REFERENCE TO RELATED APPLICATIONS

The present application is a continuation application of International Application No. PCT/JP2021/021857, filed on Jun. 9, 2021, which claims priority to Japanese Patent Application No. 2020-113140, filed on Jun. 30, 2020. The contents of these applications are incorporated herein by reference in their entirety.

BACKGROUND

Technical Field

The present disclosure relates to a control apparatus for a vehicle.

Related Art

As a shift system for switching a shift range of a vehicle, a shift-by-wire system is known. In the shift-by-wire system, upon mechanical coupling between a shift-range switching mechanism and a shift lever of a vehicle being eliminated, a sensor detects an operating state of the shift lever. A shift actuator drives the shift-range switching mechanism based on detected operating information regarding the shift lever, thereby switching the shift range.

SUMMARY

One aspect of the present disclosure provides a control apparatus that is mountable to a vehicle that includes: an electric motor that causes the vehicle to travel by transmitting torque to a wheel through a power transmission mechanism; a lock mechanism that is capable of switching between locking and releasing the lock on the power transmission mechanism; and an actuator apparatus that drives the lock mechanism. The control apparatus controls the electric motor and a shift-by-wire system provided in the vehicle. The shift-by-wire system is capable of performing switching to shift ranges of the vehicle including a shift range and a non-parking range other than the parking range. The control apparatus drives the actuator apparatus so as to release the lock on the power transmission mechanism by the lock mechanism based on the shift range of the shift-by-wire system being switched from the parking range to the non-parking range. The control apparatus performs torque correction control in which an output torque of the electric motor is corrected such that a load that acts on the lock mechanism from the power transmission mechanism is reduced based on the shift range of the shift-by-wire system being switched from the parking range to the non-parking range.

DESCRIPTION OF THE EMBODIMENTS

Figure 1:
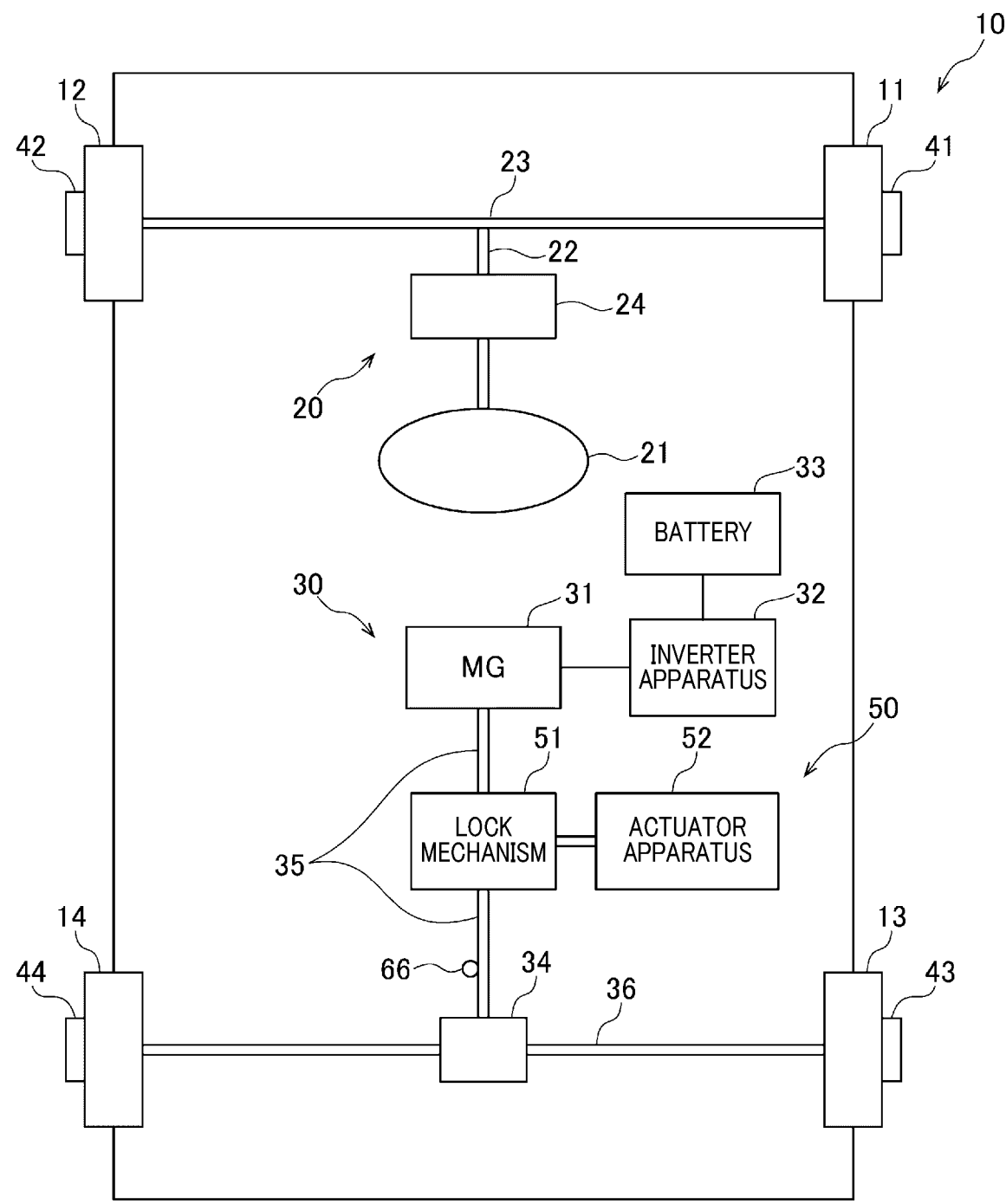
FIG. 1 is a block diagram illustrating an overall configuration of a vehicle according to a first embodiment.

Conventionally, as a shift system for switching a shift range of a vehicle, a shift-by-wire system is known. The shift-by-wire system is a system in which, upon mechanical coupling between a shift-range switching mechanism and a shift lever of a vehicle being eliminated, a sensor detects an operating state of the shift lever and a shift actuator drives the shift-range switching mechanism based on detected operating information regarding the shift lever, thereby switching the shift range.

In the shift-range switching mechanism of the shift-by-wire system such as this, a parking lock mechanism that locks a power transmission shaft of a wheel such that a wheel does not rotate when the shift lever is operated to a parking range is mounted. The parking lock mechanism includes a parking gear that rotates integrally with the power transmission shaft and a parking pawl that is displaced integrally with the shift-range switching mechanism. In the parking lock mechanism, rotation of the power transmission shaft is locked by the parking pawl meshing with the parking gear when the shift lever is operated to a P range. The parking pawl is displaced based on power that is transmitted from the shift actuator.

Here, when a vehicle is parked on a slope, a force that is based on gravity acts in a front/rear direction of the vehicle. A torque is applied to the wheel based on the force that acts in the front/rear direction of the vehicle. Therefore, the torque on the wheel is transmitted to the parking gear through the power transmission shaft, and thus a large force may be applied to a meshing portion between the parking gear and the parking pawl. In the parking lock mechanism, when the shift lever is operated from the parking range to a range other than the parking range, the lock on the parking gear by the parking pawl is required to be released. When a large force is applied to the meshing portion between the parking gear and the parking pawl, a torque that is required of the shift actuator to release the parking gear and the parking pawl increases. This is a factor that leads to increase in size of the shift actuator.

Therefore, in a vehicle disclosed in JP-A-2018-167655, when the vehicle is detected as being parked on a slope, a parking brake is automatically operated by operation of an electric parking brake apparatus. The force that is applied to the meshing portion between the parking gear and the parking pawl is thereby reduced. Consequently, the torque that is required for the shift actuator decreases, and thus the shift actuator can be reduced in size.

In the vehicle disclosed in JP-A-2018-167655, the electric parking brake apparatus is required to generate a braking force that enables a stopped state of the vehicle to be maintained when the vehicle is stopped on a slope. Therefore, when the stopped state of the vehicle is to be maintained on an assumed maximum gradient (such as a gradient of 20°) of a slope, power that is required of an actuator of the electric parking brake apparatus increases. Therefore, increase in size, increase in cost, and the like of the actuator become unavoidable. In addition, in a vehicle in which the electric parking brake apparatus is originally not mounted, a configuration such as that disclosed in JP-A-2018-167655 cannot be used.

It is thus desired to provide a control apparatus for a vehicle that is capable of reducing power that is required of an actuator through a simpler configuration.

An exemplary embodiment of the present disclosure provides a control apparatus that is mountable to a vehicle that includes: an electric motor that causes the vehicle to travel by transmitting torque to a wheel through a power transmission mechanism; a lock mechanism that is capable of switching between locking and releasing the lock on the power transmission mechanism; and an actuator apparatus that drives the lock mechanism. The control apparatus includes: a motor control unit that controls the electric motor; and a shift control unit that controls a shift-by-wire system provided in the vehicle. The shift-by-wire system is capable of performing switching to shift ranges of the vehicle including a shift range and a non-parking range other than the parking range. The shift control unit drives the actuator apparatus so as to release the lock on the power transmission mechanism by the lock mechanism based on the shift range of the shift-by-wire system being switched from the parking range to the non-parking range. The motor control unit performs torque correction control in which an output torque of the electric motor is corrected such that a load that acts on the lock mechanism from the power transmission mechanism is reduced based on the shift range of the shift-by-wire system being switched from the parking range to the non-parking range.

According to this configuration, the actuator apparatus is driven in a state in which the load that acts on the lock mechanism is reduced. Therefore, power that is required of the actuator apparatus to release the lock by the lock mechanism can be reduced. Consequently, an electric parking brake apparatus such as that described in above-described JP-A-2018-167655 is unnecessary, and thus the power that is required for the actuator apparatus can be reduced through a simpler configuration.

An embodiment of a control apparatus for a vehicle will hereinafter be described with reference to the drawings. To facilitate understanding of the descriptions, identical constituent elements in the drawings are given the same reference numbers whenever possible. Redundant descriptions are omitted.

First Embodiment

First, an overall configuration of a vehicle in which a control apparatus according to a first embodiment is mounted will be described.

A vehicle 10 of the present embodiment shown in FIG. 1 is a so-called electric vehicle that travels using a motor generator 31 as a power source. As shown in FIG. 1, the vehicle 10 includes a steering apparatus 20, a power system 30, brake apparatuses 41 to 44, and a shift-by-wire (SBW) system 50.

The steering apparatus 20 is configured such that, when a driver rotatably operates a steering wheel 21, a steering torque that is applied to the steering wheel 21 at this time is transmitted to a steering mechanism 23 through a steering shaft 22, and respective steering angles of a front right wheel 11 and a front left wheel 12 are thereby changed. The steering apparatus 20 includes an actuator apparatus 24 that assists with a steering operation by the driver by applying an assist torque that is based on the steering torque that is applied to the steering wheel 21.

The power system 30 includes the motor generator (MG) 31, an inverter apparatus 32, a battery 33, and a differential gear 34.

The inverter apparatus 32 converts direct-current power supplied from the battery 33 to three-phase alternating-current power, and supplies the motor generator 31 with the converted three-phase alternating-current power.

The motor generator 31 operates as an electric motor during accelerating travel of the vehicle 10. When operating as the electric motor, the motor generator 31 is driven based on the three-phase alternating-current power supplied from the inverter apparatus 32. Power from the motor generator 31 is transmitted to a rear right wheel 13 and a rear left wheel 14 through a power transmission shaft 35, the differential gear 34, and a drive shaft 36. As a result, a torque is applied to the rear wheels 13 and 14, and the vehicle 10 travels in an accelerating manner.

The motor generator 31 is capable of operating as a power generator during decelerating travel of the vehicle 10. When operating as the power generator, the motor generator 31 generates power through a regenerative operation. Braking force is respectively applied to the rear wheels 13 and 14 by the regenerative operation of the motor generator 31. Three-phase alternating-current power that is generated by the regenerative operation of the motor generator 31 is converted to direct-current power by the inverter apparatus 32, and the battery 33 is charged by the direct-current power.

In this manner, in the vehicle 10 of the present embodiment, the rear right wheel 13 and the rear left wheel 14 function as driving wheels, and the front right wheel 11 and the front left wheel 12 function as driven wheels. Hereafter, for convenience, the rear right wheel 13 and the rear left wheel 14 are also collectively referred to as "driving wheels 13 and 14."

According to the present embodiment, the motor generator 31 corresponds to an electric motor. In addition, the power transmission shaft 35, the differential gear 34, and the drive shaft 36 correspond to a power transmission mechanism that transmits an output torque of the motor generator 31 to the driving wheels 13 and 14.

The brake apparatuses 41 to 44 are respectively provided in the wheels 11 to 14 of the vehicle 10. For example, the brake apparatuses 41 to 44 include a rotating body that rotates integrally with the wheels 11 to 14, a brake pad that is arranged so as to oppose the rotating body, and a hydraulic circuit that places the brake pad in contact with and separates the brake pad from the rotating body by applying hydraulic pressure to the brake pad. In the brake apparatuses 41 to 44, the brake pad comes into contact with the rotating body due to the hydraulic pressure from the hydraulic circuit, and thus a frictional force is applied to the rotating body. A braking force is thereby applied to the wheels 11 to 14.

The SBW system 50 is a system that, upon detection of an operation range of a shift lever of the vehicle 10 by a sensor, switches a shift range of the vehicle 10 based on a detected position of the shift lever. In the vehicle 10, the operation range of the shift lever can be selectively switched between a parking range, a drive range, a neutral range, a reverse range, and the like. Hereafter, for convenience, the operation ranges other than the parking range are referred to as a non-parking range. The SBW system 50 of the present embodiment provides a so-called parking lock function for locking the power transmission shaft 35 when the operation range of the shift lever is switched from the non-parking range to the parking range, and releasing the lock on the power transmission shaft 35 when the operation range of the shift lever is switched from the parking range to the non-parking range. As a configuration for actualizing the parking lock function, the SBW system 50 includes a lock mechanism 51 and an actuator apparatus 52.

Figure 2:
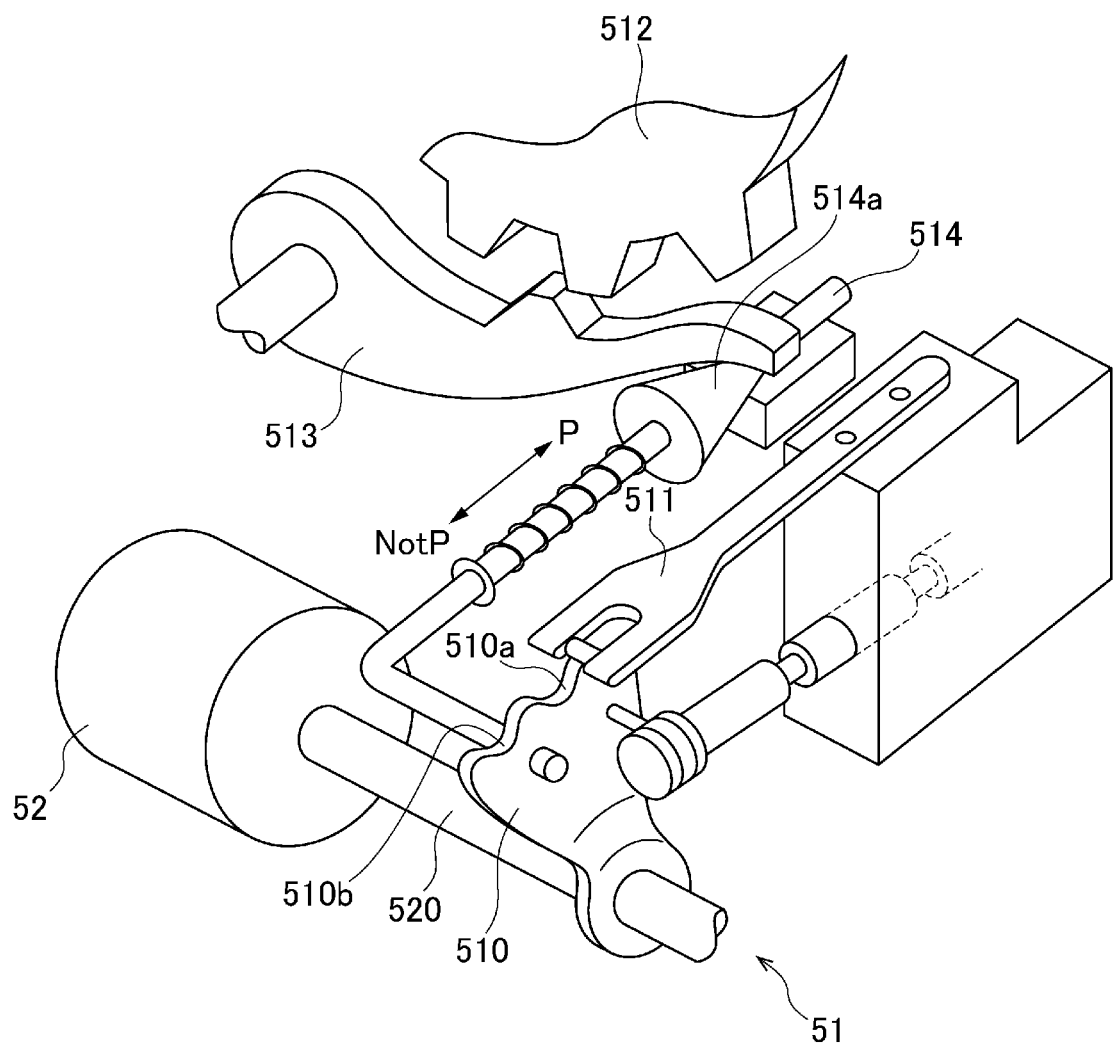
FIG. 2 is a perspective view illustrating a structure of a lock mechanism according to the first embodiment.

As shown in FIG. 2, the lock mechanism 51 includes a detent plate 510 and a detent spring 511. The detent plate 510 rotates integrally with an output shaft 520 of the actuator apparatus 52. The detent spring 511 fits into any of a plurality of recessing portions 510a and 510b that are formed on an outer edge portion of the detent plate 510.

The lock mechanism 51 further includes a parking gear 512, a parking pawl 513, and a parking rod 514. The parking gear 512 rotates integrally with the power transmission shaft 35 shown in FIG. 1. The parking pawl 513 is capable of coming into contact with and separating from the parking gear 512. The parking rod 514 is connected to the detent plate 510.

When the detent plate 510 is positioned in a rotation position in which the detent spring 511 is fitted into the recessing portion 510a, the parking pawl 513 and the parking gear 512 do not mesh, and thus the rotation of the power transmission shaft 35 is not locked. Hereafter, for convenience, a state of the lock mechanism 51 when the detent spring 511 is fitted into the recessing portion 510a is referred to as a "lock released state."

When the detent plate 510 is positioned in a rotation position in which the detent spring 511 is fitted into the recessing portion 510b, a conical body 514a that is provided in a tip end portion of the parking rod 514 presses into a lower side of the parking pawl 513, and thus the parking pawl 513 is pressed upward. As a result, the rotation of the power transmission shaft 35 is locked by the parking pawl 513 and the parking gear 512 being meshed together. Hereafter, for convenience, a state of the lock mechanism 51 when the detent spring 511 is fitted into the recessing portion 510b is referred to as a "locked state."

Next, an electrical configuration of the vehicle 10 will be described.

Figure 3:
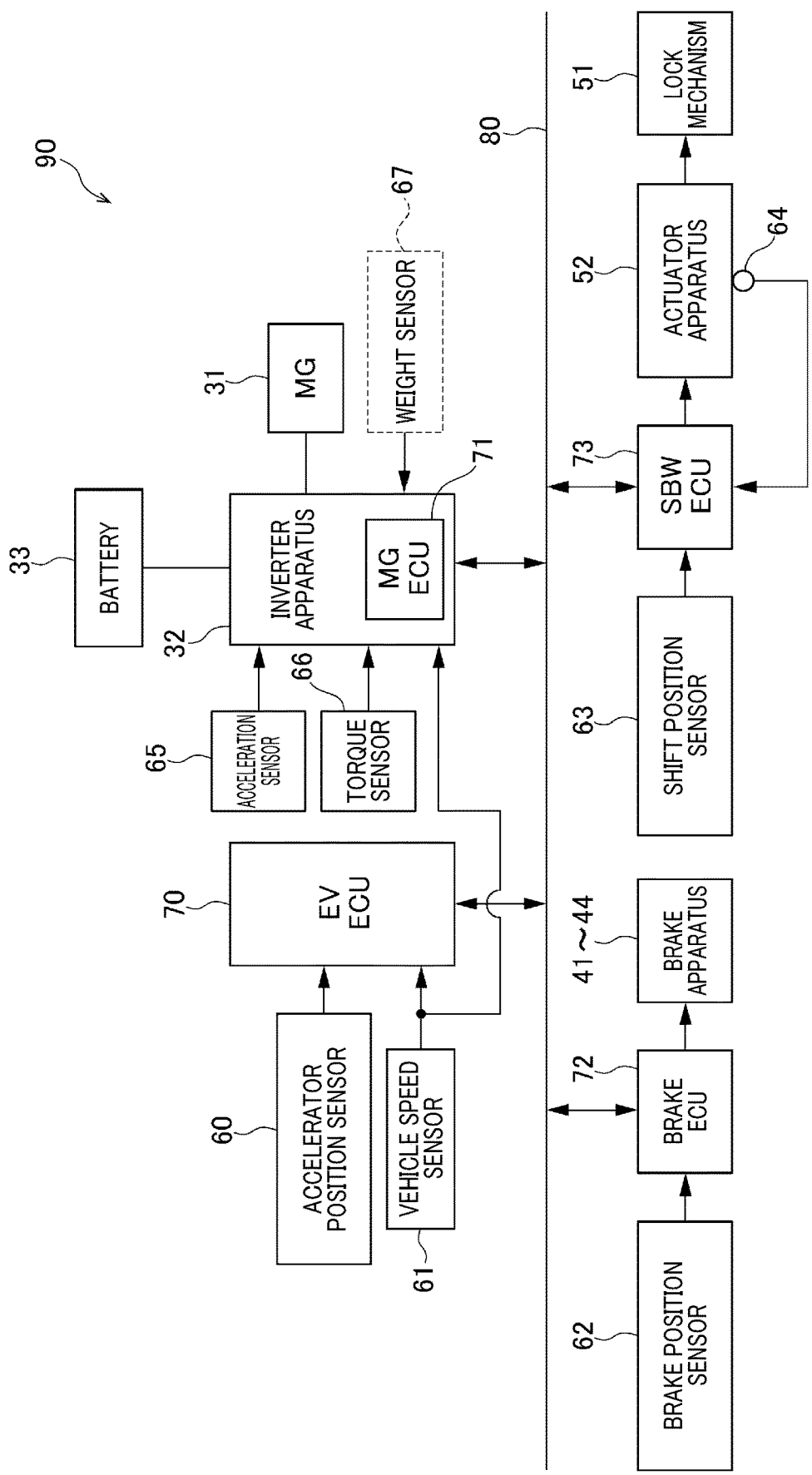
FIG. 3 is a block diagram illustrating an overall configuration of a control apparatus for a vehicle according to the first embodiment.

As shown in FIG. 3, the vehicle 10 includes an accelerator position sensor 60, a vehicle speed sensor 61, a brake position sensor 62, a shift position sensor 63, a rotation sensor 64, an acceleration sensor 65, and a torque sensor 66. In addition, the vehicle 10 includes, as sections that perform various types of control thereof, an electric vehicle (EV) electronic control unit (ECU) 70, an MGECU 71, a brake ECU 72, and an SBWECU 73. A control apparatus 90 of the vehicle 10 is configured by these elements 60 to 66 and 70 to 73.

The accelerator position sensor 60 detects a depression amount of an accelerator pedal of the vehicle 10 and outputs, to the EVECU 70, a signal that is based on the detected depression amount of the accelerator pedal. The vehicle speed sensor 61 detects a vehicle speed that is a traveling speed of the vehicle 10 and outputs, to the EVECU 70 and the inverter apparatus 32, a signal that is based on the detected vehicle speed. The brake position sensor 62 detects whether a brake pedal of the vehicle 10 is depressed and outputs, to the brake ECU 72, a signal that is based on a detected operation position of the brake pedal. The shift position sensor 63 detects the operation range of the shift lever of the vehicle 10 and outputs, to the SBWECU 73, a signal that is based on the detected operation range. The rotation sensor 64 detects a rotation angle of the output shaft 520 of the actuator apparatus 52 shown in FIG. 2 and outputs, to the SBWECU 73, a signal that is based on the detected rotation angle. The acceleration sensor 65 detects an acceleration in an advancing direction of the vehicle 10, that is, an acceleration in the front/rear direction of the vehicle 10 and outputs, to the inverter apparatus 32, a signal that is based on the detected acceleration of the vehicle 10. The torque sensor 66 is provided in the power transmission shaft 35 as shown in FIG. 1. The torque sensor 66 detects a torque that is applied to the power transmission shaft 35 and outputs, to the inverter apparatus 32, a signal that is based on the detected torque.

Here, according to the present embodiment, the acceleration sensor 65 corresponds to an acceleration detecting unit.

The ECUs 70 to 73 are mainly configured by a microcomputer that has a central processing unit (CPU), a read-only memory (ROM), a random access memory (RAM), and the like. The ECUs 70 to 73 perform various types of control by executing programs that are stored in the ROM in advance. The ECUs 70 to 73 are capable of transmitting and receiving various types of information over an onboard network 80, such as a controller-area network (CAN), that is mounted in the vehicle 10.

The MGECU 71 is provided in the inverter apparatus 32. The MGECU 71 controls the output torque of the motor generator 31 by driving the inverter apparatus 32 and changing an amount of energization of the motor generator 31. Specifically, a target torque that is a target value of the output torque of the motor generator 31 is transmitted to the MGECU 71 from the EVECU 70. The MGECU 71 controls the inverter apparatus 32 such that a torque that is based on the target torque is outputted from the motor generator 31. In addition, during deceleration of the vehicle 10 and the like, the MGECU 71 controls the inverter apparatus 32 such that regenerative power generation is performed in the motor generator 31. According to the present embodiment, the MGECU 71 corresponds to a motor control unit.

The brake ECU 72 generates a braking force in the vehicle 10 by driving the brake apparatuses 41 to 44 based on the operation position of the brake pedal that is detected by the brake position sensor 62. According to the present embodiment, the brake ECU 72 corresponds to a brake control unit.

The SBWECU 73 detects the operation range of the shift lever based on an output signal from the shift position sensor 63. In addition, when switching of the detected operation range is detected, the SBWECU 73 sets the operation range after switching as a target shift range of the SBW system 50. Then, the SBWECU 73 controls the actuator apparatus 52 based on the set target shift range. For example, when the target shift range is switched from the non-parking range to the parking range, the SBWECU 73 drives the actuator apparatus 52 such that the lock mechanism 51 is in the locked state. In this case, the state is such that transmission of power between the motor generator 31 and the driving wheels 13 and 14 cannot be performed. Meanwhile, when the target shift range is switched from the parking range to the non-parking range, the SBWECU 73 drives the actuator apparatus 52 such that the lock mechanism 51 is in the lock released state. In this case, the transmission of power between the motor generator 31 and the driving wheels 13 and 14 can be performed.

In this manner, the SBWECU 73 of the present embodiment locks the power transmission shaft 35 based on the operation range of the shift lever being switched from the non-parking range to the parking range, and releases the lock on the power transmission shaft 35 based on the operation range of the shift lever being switched from the parking range to the non-parking range. According to the present embodiment, the SBWECU 73 corresponds to a shift control unit.

Figure 4:
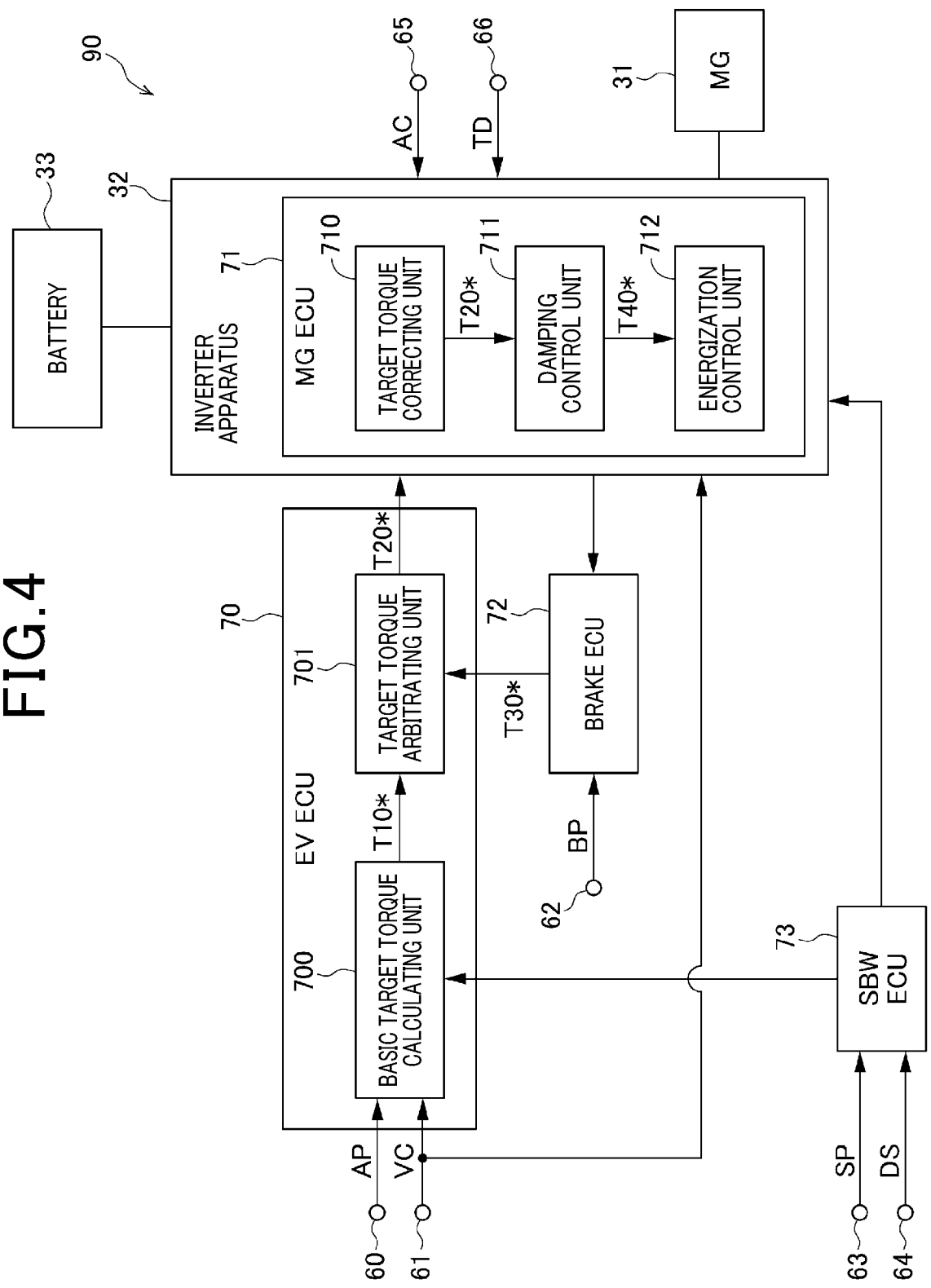
FIG. 4 is a block diagram illustrating an overall configuration of the control apparatus for a vehicle according to the first embodiment.

The EVECU 70 is a section that integrally controls the vehicle 10. Specifically, as shown in FIG. 4, the EVECU 70 includes a basic target torque calculating unit 700 and a target torque arbitrating unit 701.

The basic target torque calculating unit 700 acquires information on a depression amount AP of the accelerator pedal and a vehicle speed VC based on an output signal from the accelerator position sensor 60 and an output signals from the vehicle speed sensor 61. In addition, the basic target torque calculating unit 700 acquires information on an operation range SP of the shift lever from the SBWECU 73. The basic target torque calculating unit 700 has a plurality of maps for calculating a basic target torque T10* from the depression amount AP of the accelerator pedal and the vehicle speed VC. The plurality of maps are prepared in advance so as to respectively correspond to the plurality of operation ranges to which the shift lever can be operated. The basic target torque calculating unit 700 determines which of the plurality of maps to be used based on the information on the operation range SP of the shift lever, and calculates the basic target torque T10* based on the depression amount AP and the vehicle speed VC from the determined map. The basic target torque calculating unit 700 outputs the calculated basic target torque T10* to the target torque arbitrating unit 701.

The target torque arbitrating unit 701 sets a target torque T20* based on the basic target torque T10* that is outputted from the basic target torque calculating unit 700 and a brake target torque T30* that is outputted from the brake ECU 72. Specifically, when a brake command is not transmitted from the brake ECU 72, the target torque arbitrating unit 701 sets the basic target torque T10* as is as the target torque T20*. Meanwhile, when the brake pedal being depressed is detected based on an operation position BP of the brake pedal detected by the brake position sensor 62, the brake ECU 72 transmits the brake command that includes the brake target torque T30* to the EVECU 70. The brake target torque T30* is a target value of a torque in a braking direction that is to be outputted from the motor generator 31 to decelerate the vehicle 10. When the brake command is transmitted from the brake ECU 72, the target torque arbitrating unit 701 sets the brake target torque T30* that is included in the brake command as the target torque T20*, instead of the basic target torque T10*. The target torque arbitrating unit 701 transmits the set target torque T20* to the MGECU 71.

The MGECU 71 sets an energization control value of the motor generator 31 based on the target torque T20* that is transmitted from the EVECU 70, and controls the inverter apparatus 32 based on the set energization control value. As a result, electric power that is based on the energization control value is supplied from the inverter apparatus 32 to the motor generator 31, and a torque that is based on the target torque T20* is outputted from the motor generator 31.

Figure 5:
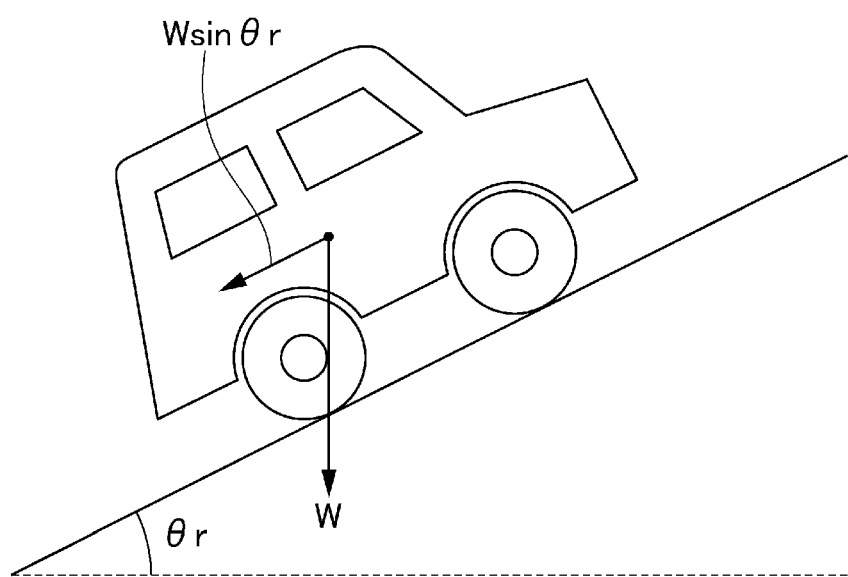
FIG. 5 is a diagram schematically illustrating a force that acts on a vehicle that is stopped on a slope.

Here, in a case in which the vehicle 10 stops on an uphill road such as that shown in FIG. 5, when a road surface gradient is θr and a gravitational force acting on the vehicle is W, a force represented by W×sin(θr) in a retreating direction of the vehicle 10 acts on the vehicle 10. The road surface gradient θr indicates a gradient of a road surface of an upward slope by a positive value and a gradient of a road surface of a downward slope by a negative value. In addition, when the operation range of the shift lever is operated to the parking range after the vehicle 10 is stopped, the lock mechanism 51 shown in FIG. 2 is set to the locked state. That is, the parking pawl 513 is meshed with the parking gear 512.

The force represented by W×sin(θr) in the retreating direction of the vehicle 10 acts on the vehicle 10, and thus a torque is applied to the driving wheels 13 and 14. Therefore, the torque is transmitted to the lock mechanism 51 through the drive shaft 36, the differential gear 34, and the power transmission shaft 35, and thus a large force is applied to a meshing portion between the parking gear 512 and the parking pawl 513 of the lock mechanism 51. In this case, when the operation range of the shift lever is subsequently operated from the parking range to the non-parking range, a torque in the actuator apparatus 52 that is required to remove the parking pawl 513 from the parking gear 512 increases. This is a factor that leads to increase in size of the actuator apparatus 52.

Therefore, in the vehicle 10 of the present embodiment, when the operation range of the shift lever is operated from the parking range to the non-parking range, the motor generator 31 is made to output a torque that enables the force that is applied to the meshing portion between the parking gear 512 and the parking pawl 513 to be reduced, and the actuator apparatus 52 transitions the lock mechanism 51 from the locked state to the lock released state. That is, coordinated control of the motor generator 31 and the actuator apparatus 52 is performed when the lock mechanism 51 is released. As a result, the torque that is required of the actuator apparatus 52 can be reduced. Consequently, the actuator apparatus 52 can be made smaller in size.

Next, the coordinated control of the motor generator 31 and the actuator apparatus 52 when the lock mechanism 51 is released will be described in detail.

As shown in FIG. 4, the MGECU 71 includes a target torque correcting unit 710, a damping control unit 711, and an energization control unit 712.

Figure 6:
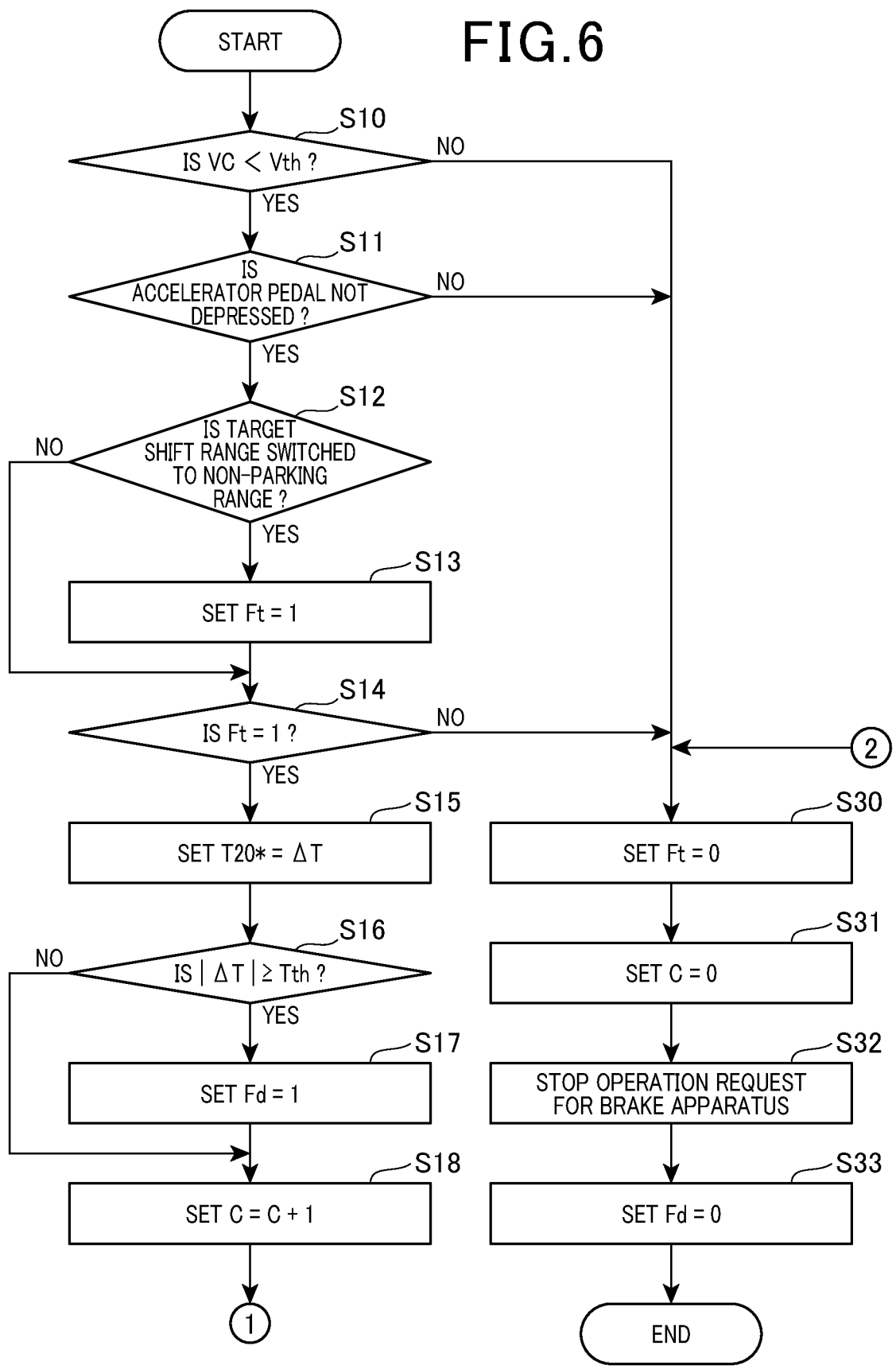
FIG. 6 is a flowchart illustrating a portion of the steps in a process that is performed by the control apparatus for a vehicle according to the first embodiment.
Figure 7:
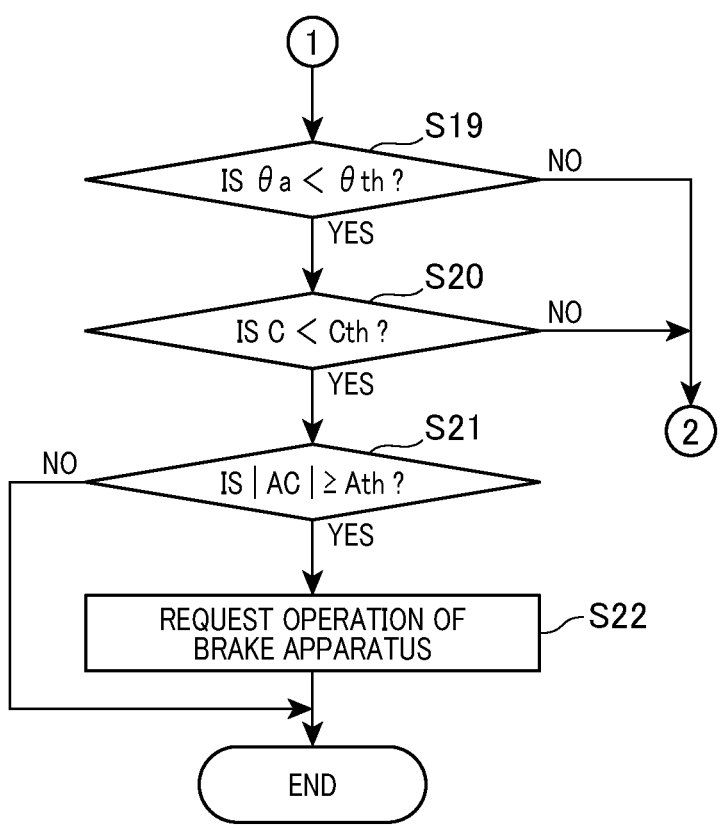
FIG. 7 is a flowchart illustrating a portion of the steps in the process that is performed by the control apparatus for a vehicle according to the first embodiment.

The target torque correcting unit 710 is a section that corrects the target torque T20* that is outputted from the EVECU 70 such that the motor generator 31 outputs the torque that enables the force that is applied to the meshing portion between the parking gear 512 and the parking pawl 513 to be reduced. Specifically, the target torque correcting unit 710 corrects the target torque T20* by performing processes that are shown in FIG. 6 and FIG. 7. Here, the target torque correcting unit 710 repeatedly performs the processes shown in FIG. 6 and FIG. 7 at a predetermined cycle.

As shown in FIG. 6, first, as a process at step S10, the target torque correcting unit 710 determines whether the vehicle speed VC detected by the vehicle speed sensor 61 is less than a predetermined speed Vth. The predetermined speed Vth is set in advance by an experiment or the like such that whether the vehicle 10 is stopped can be determined. The predetermined speed Vth is stored in the ROM of the MGECU 71.

When an affirmative determination is made in the process at step S10, that is, when the vehicle 10 is stopped, as a process at step S11, the target torque correcting unit 710 determines whether the accelerator pedal is not depressed based on the depression amount AP of the accelerator pedal detected by the accelerator position sensor 60.

When a negative determination is made in the process at step S10 or the process at step S11, that is, when the vehicle 10 is traveling or the accelerator pedal is being depressed, as a process at step S30, the target torque correcting unit 710 sets a torque correction flag Ft to 0. When the torque correction flag Ft is set to 0, the target torque correcting unit 710 outputs the target torque T20* that is calculated by the basic target torque calculating unit 700 as is to the damping control unit 711. In addition, as a process at step S31, the target torque correcting unit 710 sets a value of a counter C to 0. Furthermore, as a process at step S32, when a request for brake operation is issued to the brake ECU 72, the target torque correcting unit 710 stops the request. Moreover, as a process at step S33, the target torque correcting unit 710 sets a delay request flag Fd to 0, and then temporarily ends the processes shown in FIG. 6 and FIG. 7.

When an affirmative determination is made in both the process at step S10 and the process at step S11, that is, when the vehicle 10 is stopped and the accelerator pedal is not depressed, as a process at step S12, the target torque correcting unit 710 determines whether the target shift range that can be acquired from the SBWECU 73 is switched from the parking range to the non-parking range. When an affirmative determination is made in the process at step S12, that is, when the target shift range is switched from the parking range to the non-parking range, as a process at step S13, the target torque correcting unit 710 sets the torque correction flag Ft to 1 and proceeds to a process at step S14. The target torque correcting unit 710 also proceeds to the process at step S14 when a negative determination is made in the process at step S12.

As the process at step S14, the target torque correcting unit 710 determines whether the torque correction flag Ft is 1. When the target torque correcting unit 710 has not performed the process at step S13, that is, when the target shift range is not switched from the parking range to the non-parking range, the torque correction flag Ft is set to 0. Therefore, the target torque correcting unit 710 makes a negative determination in the process at step S14. In this case, the target torque correcting unit 710 performs processes at steps S30 to S33.

Meanwhile, when the target torque correcting unit 710 performs the process at step S13, that is, when the target shift range is switched from the parking range to the non-parking range, the torque correction flag Ft is set to 1. Therefore, the target torque correcting unit 710 makes an affirmative determination in the process at step S14. In this case, as a process at step S15, the target torque correcting unit 710 corrects the target torque T20* of the motor generator 31. Specifically, the target torque correcting unit 710 calculates a torque correction amount $\Delta T$ based on the acceleration AC of the vehicle 10 detected by the acceleration sensor 65. According to the present embodiment, the torque correction amount $\Delta T$ corresponds to a correction amount of an output torque of an electric motor.

The torque correction amount $\Delta T$ is a torque to be outputted from the motor generator 31 to reduce the force that is applied to the meshing portion between the parking gear 512 and the parking pawl 513. An absolute value $|\Delta T|$ of the torque correction amount increases as an absolute value of the gradient $\theta r$ of the road surface on which the vehicle 10 is stopped increases. In addition, a positive/negative symbol of the torque correction amount $\Delta T$ is reversed between when the road surface gradient $\theta r$ is a positive value and when the road surface gradient $\theta r$ is a negative value, that is, when the road is an uphill road and when the road is a downhill road.

Meanwhile, when the vehicle 10 is stopped on an uphill road or a downhill road, the acceleration sensor 65 detects a gravitational acceleration that is based on the road surface gradient $\theta r$. Therefore, a correlation is present between the acceleration AC that is detected by the acceleration sensor 65 and the gradient $\theta r$ of the road surface on which the vehicle 10 is stopped. Using this correlation, the target torque correcting unit 710 uses the acceleration AC that is detected by the acceleration sensor 65 as a parameter that indicates the gradient $\theta r$ of the road surface. In this manner, according to the present embodiment, the acceleration sensor 65 corresponds to a road surface gradient detecting unit that detects a gradient of a road surface on which the vehicle 10 is positioned. Here, the acceleration sensor 65 detects the gravitational acceleration that acts on the vehicle 10 when the vehicle 10 is stopped on an uphill road as the acceleration AC that is a positive value and detects the gravitational acceleration that acts on the vehicle 10 when the vehicle 10 is stopped on a downhill road as the acceleration AC that is a negative value.

Figure 8:
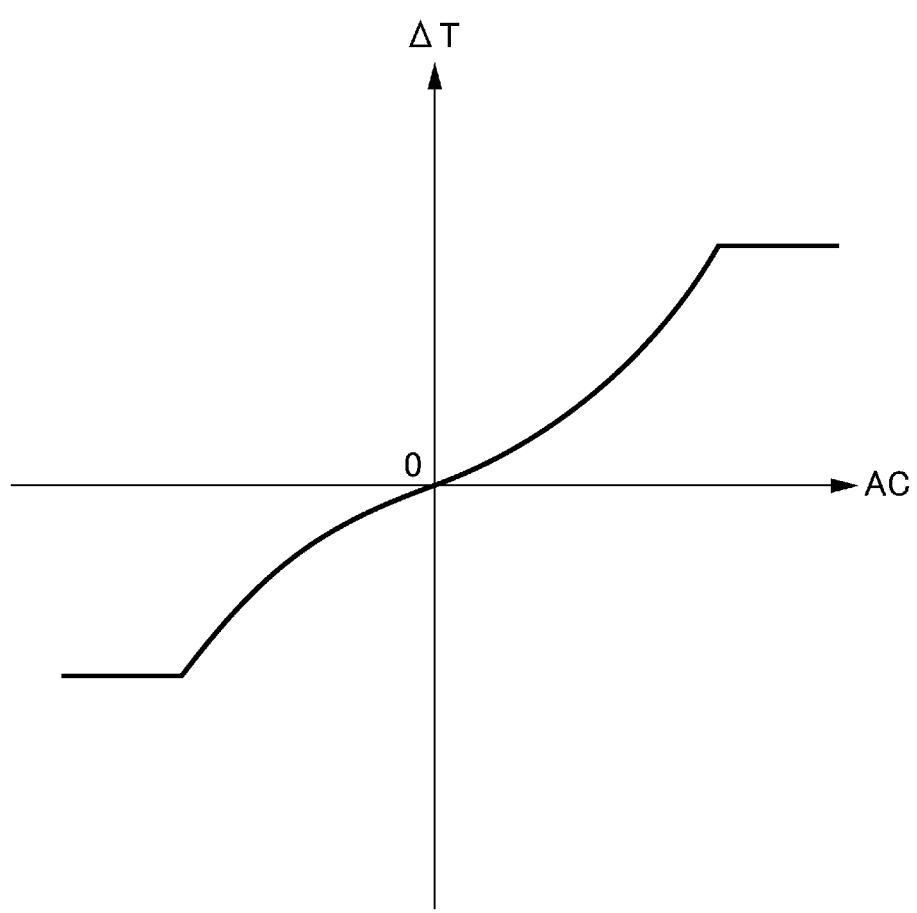
FIG. 8 is a map illustrating a relationship between an acceleration AC that is detected by an acceleration sensor and a torque correction amount ΔT, used by the control apparatus for a vehicle according to the first embodiment.

According to the present embodiment, as a map that indicates the relationship between the acceleration AC detected by the acceleration sensor 65 and the torque correction amount $\Delta T$, for example, a map such as that shown in FIG. 8 is determined in advance by an experiment or the like and stored in the ROM of the MGECU 71. As a process at step S15 shown in FIG. 6, the target torque correcting unit 710 calculates the torque correction amount $\Delta T$ based on the map shown in FIG. 8, from the acceleration AC detected by the acceleration sensor 65. The torque based on the torque correction amount $\Delta T$ is outputted from the motor generator 31, and thus the force applied to the meshing portion between the parking gear 512 and the parking pawl 513 is reduced. According to the present embodiment, this process corresponds to torque correction control. The target torque correcting unit 710 outputs the calculated target torque T20* to the damping control unit 711.

As a process at step S16 following step S15, the target torque correcting unit 710 determines whether the absolute value $|\Delta T|$ of the torque correction amount is equal to or greater than a predetermined value Tth. In the vehicle 10 of the present embodiment, basically, the force that is applied to the meshing portion between the parking gear 512 and the parking pawl 513 of the lock mechanism 51 can basically be reduced if the torque based on the torque correction amount $\Delta T$ is outputted from the motor generator 31. Therefore, the actuator apparatus 52 is merely required to be operated such that the lock on the parking gear 512 and the parking pawl 513 is released. However, when a large force is applied to the meshing portion between the parking gear 512 and the parking pawl 513, if the lock by the lock mechanism 51 is immediately released upon the torque correction control based on the torque correction amount $\Delta T$ being performed in the motor generator 31, shock in the lock mechanism 51 may be difficult to mitigate.

Specifically, an absolute value of the force that is applied to the meshing portion between the parking gear 512 and the parking pawl 513 increases as an absolute value $|\theta r|$ of the gradient of the road surface on which the vehicle 10 is stopped increases. When the force on the meshing portion therebetween increases, a certain amount of time is required until the force on the meshing portion is actually reduced after the torque correction control based on the torque correction amount ΔT is started in the motor generator 31. Therefore, if the lock by the lock mechanism 51 is immediately released when the torque correction control is started in the motor generator 31, shock in the lock mechanism 51 may not be able to be mitigated. In such a case, the lock by the lock mechanism 51 being released after an elapse of a predetermined amount of time from when the torque correction control based on the torque correction amount ΔT is performed in the motor generator 31 is effective in terms of reducing shock.

Therefore, the target torque correcting unit 710 determines whether to delay the release of the lock by the lock mechanism 51 by comparing the absolute value|ΔT| of the torque correction amount and the predetermined value Tth. Here, according to the present embodiment, a relationship between the shock that is generated in the lock mechanism 51 in accompaniment with the release of the lock and the absolute value |ΔT| of the torque correction amount is determined by an experiment or the like. The predetermined value Tth is set in advance to a value that enables determination regarding whether to delay the release of the lock by the lock mechanism 51 based on a result of the experiment or the like. The predetermined value Tth is stored in the ROM of the MGECU 71. According to the present embodiment, the process at step S16 corresponds to a process for determining whether the vehicle 10 is positioned on an uphill road or a downhill road.

When the absolute value |ΔT| of the torque correction amount is equal to or greater than the predetermined value Tth, the target torque correcting unit 710 makes an affirmative determination in the process at step S16. As a process at subsequent step S17, the target torque correcting unit 710 sets the delay request flag Fd to 1 and then performs processes at step S18 and subsequent steps. When the delay request flag Fd is set to 1, a delay request is transmitted from the MGECU 71 to the SBWECU 73. When the delay request is transmitted, the SBWECU 73 maintains the lock mechanism 51 in the locked state without driving the actuator apparatus 52, even when the target shift range is switched from the parking range to the non-parking range.

Meanwhile, when the absolute value |ΔT| of the torque correction amount is less than the predetermined value Tth, the target torque correcting unit 710 makes a negative determination in the process at step S16. The target torque correcting unit 710 performs the processes at step S18 and subsequent steps without performing the process at step S17. In this case, the delay request flag Fd is set to 0, and thus the delay request is not transmitted from the MGECU 71 to the SBWECU 73. Therefore, the SBWECU 73 drives the actuator apparatus 52 based on the target shift range being switched from the parking range to the non-parking range, and transitions the lock mechanism 51 from the locked state to the lock released state.

As the process at step S18, the target torque correcting unit 710 increments the value of the counter C. Then, as the process at step S19 shown in FIG. 7, the target torque correcting unit 710 determines whether a rotation angle θa of the actuator apparatus 52 detected by the rotation sensor 64 is less than a predetermined value θth. The predetermined value θth is stored in advance as a value that enables determination regarding whether the lock mechanism 51 shown in FIG. 2 is transitioned from the locked state to the lock released state. The predetermined value θth is stored in the ROM of the MGECU 71.

When an affirmative determination is made in the process at step S19, that is, when the rotation angle θa of the actuator apparatus 52 is less than the predetermined value θth, as the process at step S20, the target torque correcting unit 710 determines whether the value of the counter C is less than a predetermined delay value Cth. The delay value Cth is set in advance by an experiment or the like such that whether a predetermined amount of time that is enough to reduce shock in the lock mechanism 51 has elapsed from the start of torque correction control in the motor generator 31 can be determined. The delay value Cth is stored in the ROM of the MGECU 71. According to the present embodiment, the delay value Cth is a parameter that corresponds to a predetermined delay time.

When an affirmative determination is made in the process at step S20, that is, when the predetermined amount of time has not elapsed from the start of torque correction control in the motor generator 31, as the process at step S21, the target torque correcting unit 710 determines whether an absolute value |AC| of the acceleration of the vehicle 10 detected by the acceleration sensor 65 is equal to or greater than a predetermined value Ath. The predetermined value Ath is set in advance by an experiment or the like such that whether the absolute value |θr| of the gradient of the road surface on which the vehicle 10 is stopped is equal to or greater than a predetermined value can be determined. The predetermined value Ath is stored in the ROM of the MGECU 71. When an affirmative determination is made in the process at step S21, that is, when the absolute value |θr| of the gradient of the road surface on which the vehicle 10 is stopped is equal to or greater than the predetermined value, as the process at step S22, the target torque correcting unit 710 issues the request for brake operation to the brake ECU 72. When the brake operation is requested by the MGECU 71, the brake ECU 72 maintains the stopped state of the vehicle 10 by driving the brake apparatuses 41 to 44. The brake apparatuses 41 to 44 are driven in this manner for a following reason.

The absolute value |ΔT| of the torque correction amount that is set in the process at step S15 increases as the absolute value |θr| of the gradient of the road surface on which the vehicle 10 is stopped increases, and thus an absolute value of the output torque of the motor generator 31 increases. In a case where the absolute value of the output torque of the motor generator 31 increases, when the lock by the lock mechanism 51 is released, the output torque of the motor generator 31 is transmitted to the driving wheels 13 and 14, and thus the vehicle 10 may advance or retreat. Such advancing or retreating of the vehicle 10 is behavior of the vehicle 10 that is not intended by the driver. Therefore, the driver may experience discomfort.

Therefore, according to the present embodiment, to suppress such unintentional behavior of the vehicle 10, whether the gradient θr of the road surface on which the vehicle 10 is stopped has reached a gradient at which the absolute value |ΔT| of the torque correction amount of the motor generator 31 increases is determined in the process at step S21. Then, when an affirmative determination is made in the process at step S21, the brake apparatuses 41 to 44 are driven in the process at step S22 to prevent unintentional behavior of the vehicle 10.

After performing the process at step S22, the target torque correcting unit 710 temporarily ends the processes shown in FIG. 6 and FIG. 7.

Meanwhile, when a negative determination is made in the process at step S21, that is, when unintentional behavior of the vehicle 10 that is attributed to the correction of the output torque of the motor generator 31 does not occur, the target torque correcting unit 710 temporarily ends the processes shown in FIG. 6 and FIG. 7 without performing the process at step S22.

Subsequently, when a negative determination is made in the process at step S19 or the process at step S20, when the lock mechanism 51 transitions from the locked state to the lock released state or when the predetermined amount of time elapses from the start of torque correction control, the target torque correcting unit 710 performs processes at steps S30 to S33 shown in FIG. 6. In this case, as the process at step S30, the target torque correcting unit 710 changes the value of the torque correction flag Ft from 1 to 0. As a result, execution of the torque correction control is stopped. In addition, as the process at step S31, the target torque correcting unit 710 resets the value of the counter C to 0. Furthermore, as the process at step S32, when the request for brake operation is issued to the brake ECU 72, the target torque correcting unit 710 stops the request. As a result, operation of the brake apparatuses 41 to 44 is stopped. In addition, as the process at step S33, the target torque correcting unit 710 changes the value of the delay request flag Fd from 1 to 0. When the delay request flag Fd is set to 0, a delay release request is transmitted from the MGECU 71 to the SBWECU 73. When the delay release request is transmitted, the SBWECU 73 drives the actuator apparatus 52 and transitions the lock mechanism 51 from the locked state to the lock released state.

As shown in FIG. 4, the target torque correcting unit 710 outputs the target torque T20* that is set by the processes shown in FIG. 6 to the damping control unit 711. The damping control unit 711 performs damping control in which the target torque T20* is corrected to suppress vibrations based on torsion in the drive shaft 36. For example, the damping control unit 711 performs a filtering process that is based on a notch filter that attenuates a frequency component of torsional resonance of the drive shaft 36, on the target torque T20*. Alternatively, when the vehicle 10 is provided with a sensor that is capable of detecting a rotation angle of the drive shaft 36, the damping control unit 711 may detect the torsional resonance of the drive shaft 36 based on transitions in the rotation angle of the drive shaft 36 detected by the sensor, and correct the target torque T20* by feedback control so as to cancel out the vibrations. The target torque correcting unit 710 outputs the corrected target torque T20*to the energization control unit 712 as a final target torque T40*.

The energization control unit 712 calculates the energization control value of the motor generator 31 based on the final target torque T40* and controls the inverter apparatus 32 based on the energization control value. As a result, electric power that is based on the energization control value is supplied from the inverter apparatus 32 to the motor generator 31, and a torque based on the final target torque T40* is outputted from the motor generator 31.

Next, an operation example of the vehicle 10 of the present embodiment will be described.

Figure 9:
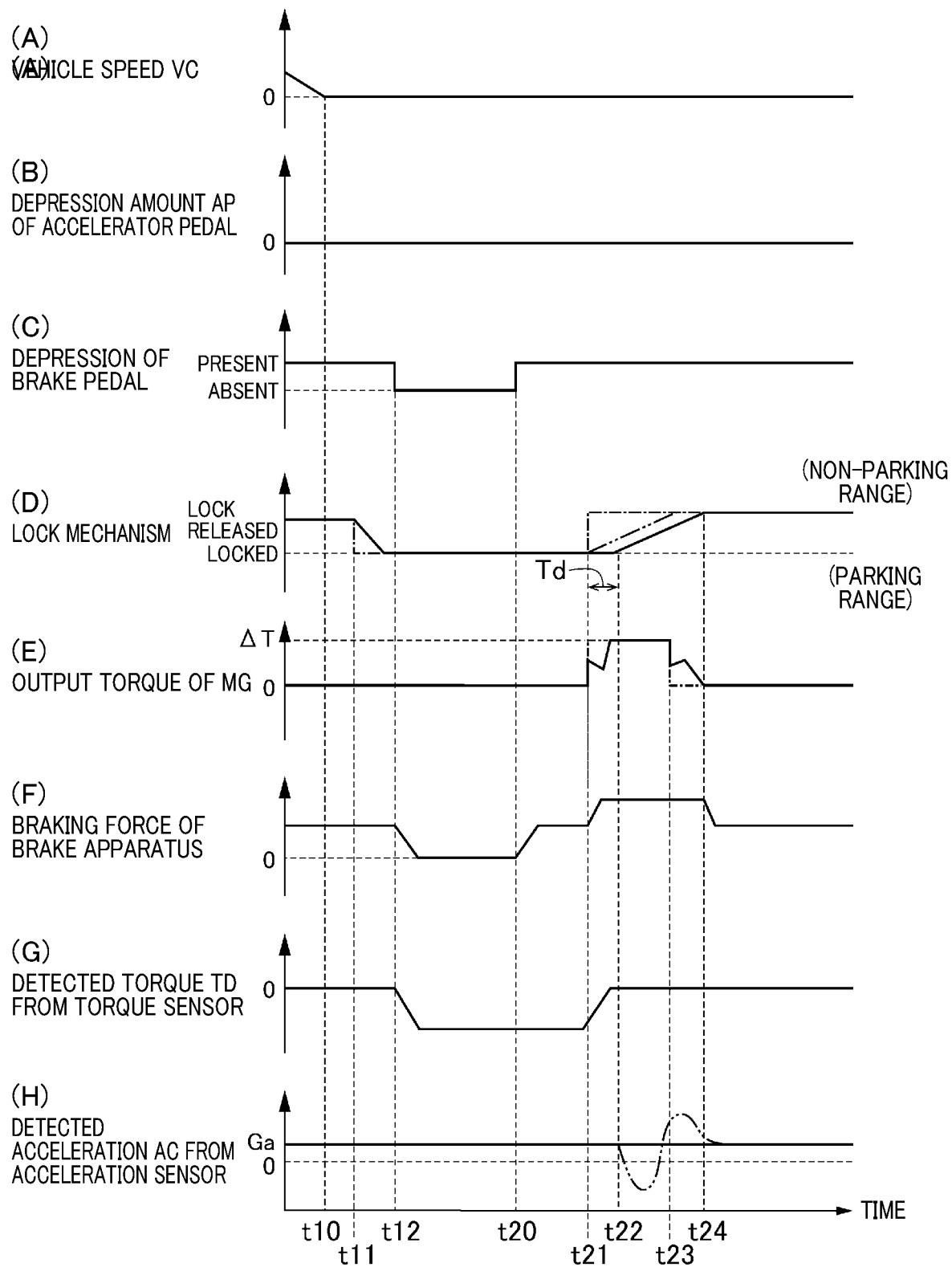
FIG. 9 is a timing chart illustrating, by (A) to (H), transitions in a vehicle speed, a depression amount of an accelerator pedal, presence/absence of depression of a brake pedal, a state of a lock mechanism, an output torque of a motor generator, a braking force of a brake apparatus, a detected torque from a torque sensor, and a detected acceleration from the acceleration sensor of the vehicle according to the first embodiment.

As shown in FIG. 9 by (A) and (B), at time t10, the vehicle 10 stops on an uphill road, and the vehicle speed VC and the depression amount AP of the acceleration pedal are 0. At this time, when the driver depresses the brake pedal, as shown in FIG. 9 by (C), the depression of the brake pedal is detected. Subsequently, when the operation to switch the operation range of the shift lever from the non-parking range, such as the drive range, to the parking range is performed, as indicated by a single-dot chain line in FIG. 9 by (D), the target shift range of the SBW system 50 is switched from the non-parking range to the parking range. As a result, as indicated by a solid line in FIG. 9 by (D), the lock mechanism 51 transitions from the lock released state to the locked state. Subsequently, when the driver moves their foot away from the brake pedal at time t12 as shown in FIG. 9 by (C), the braking force of the brake apparatuses 41 to 44 changes toward 0 as shown in FIG. 9 by (F). The force due to gravity of the vehicle 10 increasingly acts on the power transmission shaft 35 through the driving wheels 13 and 14 as the braking force of the brake apparatuses 41 to 44 becomes closer to 0. Therefore, as shown in FIG. 9 by (G), the torque on the power transmission shaft 35 detected by the torque sensor 66 increases toward the negative direction. The negative torque that acts on the power transmission shaft 35 becomes a factor in a large force being generated in the meshing portion between the parking gear 512 and the parking pawl 513 of the lock mechanism 51. Here, as shown in FIG. 9 by (H), the acceleration sensor 65 detects a gravitational acceleration Ga that is based on the gradient of the road surface on which the vehicle 10 is parked.

Subsequently, when the driver depresses the brake pedal at time t20 as shown in FIG. 9 by (C) to start traveling of vehicle 10, the braking force of the brake apparatuses 41 to 44 increases as shown in FIG. 9 by (F). In addition, when the driver performs the operation to switch the operation range of the shift lever from the parking range to the non-parking range at time t21, as indicated by the single-dot chain line in FIG. 9 by (D), the target shift range of the SBW system 50 is switched from the parking range to the non-parking range. At this time, in the vehicle 10 of the present embodiment, the target torque T20* is corrected to the torque correction amount ΔT at time t21, as indicated by a single-dot chain line in FIG. 9 by (E). On the other hand, the actual output torque of the motor generator 31 transitions as indicated by a solid line in FIG. 9 by (E), due to the damping control being performed. Consequently, the output torque of the motor generator 31 increases while vibrations in the drive shaft 36 are prevented.

Meanwhile, when the delay request flag Fd is set to 1 at time t21, even if the target shift range of the SBW system 50 is switched from the parking range to the non-parking range, the lock mechanism 51 is maintained in the locked state as indicated by a solid line in FIG. 9 by (D). Then, at time t22 after an elapse of a predetermined delay time Td from time t21, the lock mechanism 51 transitions from the locked state towards the lock released state. The predetermined delay time Td is an amount of time that corresponds to the delay value Cth that is set for the counter C and is, for example, 1 second.

Here, when the delay request flag Fd is set to 0 at time t21, as indicated by a double-dot chain line in FIG. 9 by (D), the lock mechanism 51 transitions from the locked state towards the lock released state at time t21.

As shown in FIG. 9 by (E), the output torque of the motor generator 31 is increased at time t22. Therefore, the force that is applied to the meshing portion between the parking gear 512 and the parking pawl 513 of the lock mechanism 51 is reduced. As a result, the force that is required of the actuator apparatus 52 to transition the lock mechanism 51 from the locked state to the lock released state can be reduced. Consequently, shock does not easily occur in the lock mechanism 51 when the lock mechanism 51 is transitioned to the lock released state, as shown in FIG. 9 by (H), and thus the acceleration AC that is detected by the acceleration detector 65 transitions as indicated by a solid line, rather than vibrating as indicated by a double-dot chain line.

Subsequently, when the rotation angle θa of the actuator apparatus 52 becomes less than the predetermined value θth at time t23, the target torque correcting unit 710 determines that the lock mechanism 51 is in the lock released state at this time. Therefore, as indicated by the single-dot chain line in FIG. 9 by (E), at time t23, the target torque T20* is changed from the torque correction amount ΔT to 0. At this time as well, due to the damping control being performed, the actual output torque of the motor generator 31 transitions as indicated by the solid line in FIG. 9 by (E) and becomes 0 at time t24.

Meanwhile, when the vehicle 10 is stopped on a steep uphill road, as shown in FIG. 9 by (F), the braking force of the brake apparatuses 41 to 44 starts to increase at time t21 at which the target shift range of the SBW system 50 is switched from the parking range to the non-parking range. Subsequently, the state in which the braking force of the brake apparatuses 41 to 44 is increased is maintained until time t24 at which the actual output torque of the motor generator 31 becomes 0 or, in other words, when the torque correction control is ended. Therefore, unintentional behavior of the vehicle 10 attributed to the correction of the output torque of the motor generator 31 can be suppressed.

According to the control apparatus 90 for the vehicle 10 of the present embodiment, described above, workings and effects described in (1) to (9), below, can be obtained.

(1) The SBWECU 73 drives the actuator apparatus 52 so as to release the lock on the power transmission shaft 35 by the lock mechanism 51 based on the shift range of the SBW system 50 being switched from the parking range to the non-parking range. The MGECU 71 performs the torque correction control in which the output torque of the motor generator 31 is corrected such that the load that acts on the lock mechanism 51 from the power transmission shaft 35 decreases, based on the shift lever of the SBW system 50 being switched from the parking range to the non-parking range. According to this configuration, the actuator apparatus 52 is driven in a state in which the load that acts on the lock mechanism 51 is reduced, and thus the power required for the actuator apparatus 52 to release the lock by the lock mechanism can be reduced. Consequently, an electric parking brake apparatus such as that described in JP-A-2018-167655, described above, is unnecessary. The power required of the actuator apparatus 52 can be reduced by a simple configuration.

(2) The MGECU 71 performs the torque correction control when the target shift range of the SBW system 50 changing from the parking range to the non-parking range is detected. According to this configuration, the torque that is based on the torque correction amount ΔT is outputted from the motor generator 31 when the shift range of the SBW system 50 starts to change from the parking range towards the non-parking range, and thus shock in the lock mechanism 51 can be more accurately reduced.

(3) The MGECU 71 ends the torque correction control based on the switching from the parking range to the non-parking range in the SBW system 50 being completed. According to this configuration, the torque correction control can be ended after the lock by the lock mechanism 51 is released, and thus shock in the lock mechanism 51 can be more accurately reduced.

(4) The acceleration sensor 65 detects the acceleration AC in the advancing direction of the vehicle 10 that includes the gravitational acceleration. The MGECU 71 sets the torque correction amount ΔT based on the acceleration AC of the vehicle 10 detected by the acceleration sensor 65. According to this configuration, the torque correction amount ΔT can be changed based on the magnitude of the force that is applied to the meshing portion between the parking gear 512 and the parking pawl 513 of the lock mechanism 51, and thus the torque correction amount ΔT that enables shock to be reduced can be more accurately set.

(5) The SBWECU 73 drives the actuator apparatus 52 so as to release the lock on the power transmission shaft 35 by the lock mechanism 51, based on the elapse of the predetermined delay time Td from the start of torque correction control. According to this configuration, the actuator apparatus 52 can be driven more reliably after the motor generator 31 is driven, and thus the power that is required of the actuator apparatus 52 can be more accurately reduced.

(6) When the affirmative determination is made in the process at step S16 shown in FIG. 6, that is, when the vehicle 10 is positioned on an uphill road or a downhill road, as the process at step S17, the MGECU 71 sets the delay request flag Fd to 1. As a result, when the vehicle 10 is positioned on the uphill road or the downhill road, the SBWECU 73 controls the actuator apparatus 52 so as to release the lock by the lock mechanism 51 based on the elapse of the predetermined delay time from the start of torque correction control. According to this configuration, the process for delaying a release timing of the lock by the lock mechanism 51 in relation to the start of torque correction control can be performed only when required. Consequently, shock in the lock mechanism 51 can be more accurately reduced.

(7) The brake ECU 72 operates the brake apparatuses 41 to 44 during a period in which the torque correction control is being performed. According to this configuration, unintentional behavior of the vehicle 10 attributed to the correction of the output torque of the motor generator 31 can be suppressed.

(8) The MGECU 71 is provided in the inverter apparatus 32. According to this configuration, responsiveness of the control of the motor generator 31 can be improved, compared to when the MGECU 71 is provided separately from the inverter apparatus 32.

(9) When the torque correction control is performed, the MGECU 71 performs the damping control to control the output torque of the motor generator 31 such that vibrations in the drive shaft 36 are suppressed. According to this configuration, the vibrations in the drive shaft 36 when the torque correction control is performed can be suppressed, and thus riding comfort of the vehicle 10 can be improved.

First Modification

Next, a first modification of the control apparatus 90 of the first embodiment will be described.

The target torque correcting unit 710 of the present modification calculates the torque correction value ΔT based on a vehicle state quantity that includes at least either of the gradient of the road surface on which the vehicle 10 is positioned and a weight of the vehicle, instead of the acceleration AC of the vehicle 10 detected by the acceleration sensor 65. Specifically, the target torque correcting unit 710 can calculate the gradient θr of the road surface on which the vehicle 10 is positioned based on the acceleration AC of the vehicle 10 detected by the acceleration sensor 65. In addition, when a weight sensor 67 is mounted in the vehicle 10 as indicated by a broken line in FIG. 3, the target torque correcting unit 710 can detect the weight of the vehicle 10 based on an output signal from the weight sensor 67. Here, the weight that is detected by the weight sensor 67 includes a weight of a passenger, a weight of a load, and the like, in addition to the weight of the vehicle 10 itself. In the present modification, the acceleration sensor 65 and the weight sensor 67 correspond to a vehicle state quantity detecting unit.

The torque correction amount ΔT is calculated based on the gradient of the road surface on which the vehicle 10 is positioned as in this configuration, and thus workings and effects similar to those of the first embodiment can be obtained. In addition, the force that is applied to the meshing portion between the parking gear 512 and the parking pawl 513 changes depending on the weight of the vehicle 10. Therefore, the torque correction amount ΔT is calculated based on the weight of the vehicle 10, and thus calculation accuracy of the torque correction amount ΔT can be improved. Consequently, shock in the lock mechanism 51 can be more accurately reduced.

Second Modification

Next, a second modification of the control apparatus 90 of the first embodiment will be described.

The target torque correcting unit 710 of the present modification changes the predetermined delay value Cth that is set for the value of the counter C based on the torque correction amount ΔT. For example, the target torque correcting unit 710 sets the delay value Cth to a greater value as the absolute value |ΔT| of the torque correction amount increases.

As the torque correction amount ΔT increases, that is, as the output torque of the motor generator 31 increases, an amount of time until the force that is generated in the meshing portion between the parking gear 512 and the parking pawl 513 of the lock mechanism 51 actually decreases after the torque correction control based on the torque correction amount ΔT is started in the motor generator 31 tends to increase. Therefore, if the delay value Cth is set to a greater value as the absolute value |ΔT| of the torque correction amount increases, the lock by the lock mechanism 51 is released more reliably after the force generated in the meshing portion between the parking gear 512 and the parking pawl 513 has decreased. Consequently, shock in the lock mechanism 51 can be further reduced.

Third Modification

Next, a third modification of the control apparatus 90 of the first embodiment will be described.

The brake ECU 72 of the present modification operates the brake apparatuses 41 to 44 based on the stopped vehicle 10 being displaced after the torque correction control is started by the MGECU 71. Here, when the vehicle 10 is provided with a wheel speed sensor that detects a rotation speed of the wheels 11 to 14, the brake ECU 72 can detect that the stopped vehicle 10 is displaced based on changes in the rotation speed of the wheels 11 to 14 detected by the wheel speed sensor being detected.

According to this configuration, the MGECU 71 is not required to perform the determination regarding whether to operate the brake apparatuses 41 to 44. Therefore, processing load on the MGECU 71 can be reduced.

Second Embodiment

Next, a second embodiment of the control apparatus 90 of the vehicle 10 will be described. Differences with the control apparatus 90 of the first embodiment will mainly be described.

Figure 10:
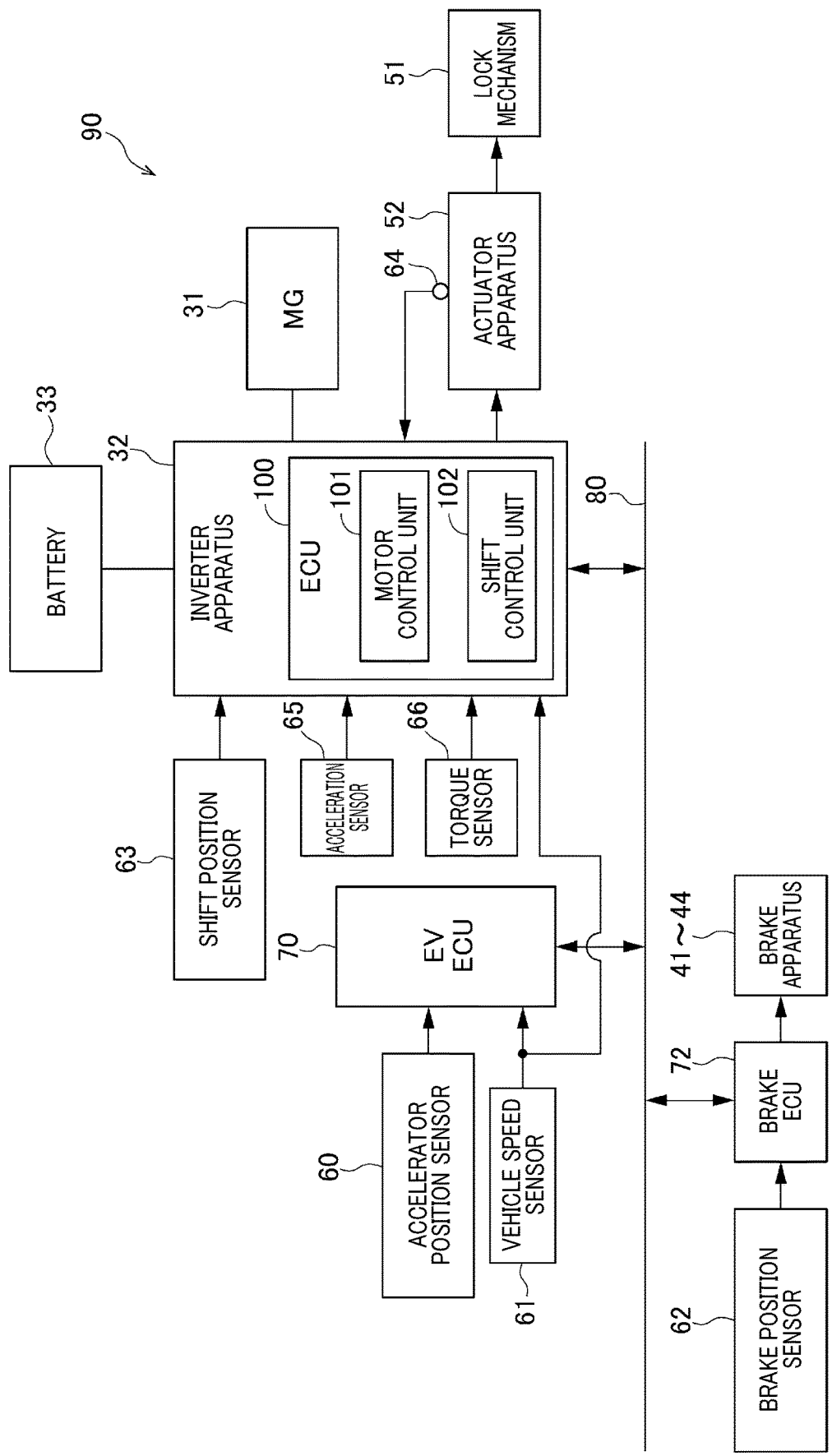
FIG. 10 is a block diagram illustrating an overall configuration of a control apparatus for a vehicle according to a second embodiment.

As shown in FIG. 10, in the control apparatus 90 of the present embodiment, an ECU 100 that includes a motor control unit 101 and a shift control unit 102 is provided in the inverter apparatus 32. The motor control unit 101 provides a function that is identical or similar to that of the MGECU 71. The shift control unit 102 provides a function that is identical or similar to that of the SBWECU 73.

According to the control apparatus 90 of the present embodiment, described above, workings and effects described in (10), below, can be obtained.

(10) The motor control unit 101 and the shift control unit 102 are configured to be collectively provided in the inverter 32, and thus speed by which the torque correction control of the motor generator 31 and the control of the lock mechanism 51 are linked can be improved, compared to a configuration in which the MGECU 71 and the SBWECU 73 are separately provided. Consequently, shock in the lock mechanism 51 can be further reduced.

Other Embodiments

Here, the above-described embodiments can also be carried out in a following manner.

In the processes shown in FIG. 7, the processes at steps S21 and S22 may be omitted. In this case, the target torque correcting unit 710 temporarily ends the processes shown in FIG. 6 and FIG. 7 based on an affirmative determination being made in the process at step S20. In this manner, the process for operating the brake apparatuses 41 to 44 based on the absolute value |AC| of the acceleration of the vehicle 10 may be omitted.

The control apparatus 90 of the first embodiment is configured to release the lock by the lock mechanism 51 by transmitting the delay request from the EVECU 70 to the SBWECU 73 when the delay request flag Fd is set to 1 in the process at step S17 shown in FIG. 6. Instead, the SBWECU 73 may be configured to release the lock by the lock mechanism 51 based on the absolute value |θr| of the gradient of the road surface on which the vehicle 10 is stopped being equal to or greater than a predetermined value, upon acquiring the information on the gradient θr of the road surface on which the vehicle 10 is stopped, based on the acceleration of the vehicle 10 detected by the acceleration sensor 65.

The control apparatus 90 and a control method thereof described in the present disclosure may be implemented by a single or a plurality of dedicated computers that are each provided so as to be configured by a processor and a memory, the processor being programmed to provide a single or a plurality of functions that are realized by a computer program. The control apparatus 90 and a control method thereof described in the present disclosure may be implemented by a dedicated computer that is provided by a processor being configured by a single or a plurality of dedicated hardware logic circuits. The control apparatus 90 and a control method thereof described in the present disclosure may be implemented by a single or a plurality of dedicated computers that are each configured by a combination of a processor that is programmed to provide a single or a plurality of functions, a memory, and a processor that is configured by a single or a plurality of hardware logic circuits. The computer program may be stored in a non-transitory computer-readable (tangible) storage medium that can be read by a computer as instructions performed by the computer. The dedicated hardware logic circuit and the hardware logic circuit may be implemented by a digital circuit that includes a plurality of logic circuits or an analog circuit.

The present disclosure is not limited to the specific examples described above. Design modifications to the above-described specific examples made as appropriate by a person skilled in the art are included in the scope of the present disclosure as long as features of the present disclosure are included. Elements included in the above-described specific examples, as well as arrangements, conditions, shapes, and the like thereof are not limited to those given as examples and can be modified as appropriate. Combinations of elements included in the above-described specific examples can be changed as appropriate as long as technical inconsistencies do not occur.

What is claimed is:

1. A control apparatus that is mountable to a vehicle that includes an electric motor that causes the vehicle to travel by transmitting torque to a wheel through a power transmission mechanism, a lock mechanism that is capable of switching between locking and releasing the lock on the power transmission mechanism, and an actuator apparatus that drives the lock mechanism, the control apparatus comprising:
   a motor control unit that controls the electric motor;
   a shift control unit that controls a shift-by-wire system that is provided in the vehicle, the shift-by-wire system being capable of performing switching to shift ranges of the vehicle including a parking range and a non-parking range other than the parking range; and
   a brake control unit that controls a brake apparatus of the vehicle, wherein
   the shift control unit drives the actuator apparatus so as to release the lock on the power transmission mechanism by the lock mechanism based on the shift ranges of the shift-by-wire system being switched from the parking range to the non-parking range,
   the motor control unit performs torque correction control in which an output torque of the electric motor is corrected such that a load that acts on the lock mechanism from the power transmission mechanism is reduced based on the shift ranges of the shift-by-wire system being switched from the parking range to the non-parking range, and
   the brake control unit operates the brake apparatus and increases a braking force of the brake apparatus to be greater than a braking force set based on depression of a brake pedal, during a period in which the torque correction control is performed.

2. The control apparatus according to claim 1, wherein:
   the motor control unit starts the torque correction control when a target shift range of the shift-by-wire system changing from the parking range to the non-parking range is detected.

3. The control apparatus according to claim 2, wherein:
   the motor control unit ends the torque correction control based on the switching from the parking range to the non-parking range in the shift-by-wire system being completed.

4. The control apparatus according to claim 3, further comprising:
   a vehicle state quantity detecting unit that detects a vehicle state quantity that includes at least either of a gradient of a road surface on which the vehicle is positioned and a weight of the vehicle, wherein
   the motor control unit sets a correction amount of the output torque of the electric motor based on the vehicle state quantity detected by the vehicle state quantity detecting unit.

5. The control apparatus according to claim 3, further comprising:
   an acceleration detecting unit that detects an acceleration in an advancing direction of the vehicle that includes a gravitational acceleration, wherein
   the motor control unit sets a correction amount of the output torque of the electric motor based on the acceleration detected by the acceleration detecting unit.

6. The control apparatus according to claim 5, wherein:
   the shift control unit drives the actuator apparatus so as to release the lock on the power transmission mechanism by the lock mechanism based on an elapse of a predetermined delay time from start of the torque correction control.

7. The control apparatus according to claim 6, wherein:
   the shift control unit controls, in response to the vehicle being determined to be positioned on an uphill road or a downhill road, the actuator apparatus so as to release the lock on the power transmission mechanism by the lock mechanism based on the elapse of the predetermined delay time from the start of torque correction control.

8. The control apparatus according to claim 6, wherein:
   the predetermined delay time is set based on the correction amount of the output torque of the electric motor.

9. The control apparatus according to claim 1, wherein:
   the motor control unit is provided in an inverter that supplies electric power to the electric motor.

10. The control apparatus according to claim 1, wherein:
    the shift control unit is provided in an inverter that supplies electric power to the electric motor.

11. The control apparatus according to claim 1, wherein:
    the motor control unit performs, in response to the torque correction control being performed, damping control in which the output torque of the electric motor is controlled such that vibrations in the power transmission mechanism are suppressed.

12. The control apparatus according to claim 1, wherein:
    the motor control unit ends the torque correction control based on the switching from the parking range to the non-parking range in the shift-by-wire system being completed.

13. The control apparatus according to claim 1, further comprising:
    a vehicle state quantity detecting unit that detects a vehicle state quantity that includes at least either of a gradient of a road surface on which the vehicle is positioned and a weight of the vehicle, wherein
    the motor control unit sets a correction amount of the output torque of the electric motor based on the vehicle state quantity detected by the vehicle state quantity detecting unit.

14. The control apparatus according to claim 1, further comprising:
    an acceleration detecting unit that detects an acceleration in an advancing direction of the vehicle that includes a gravitational acceleration, wherein
    the motor control unit sets a correction amount of the output torque of the electric motor based on the acceleration detected by the acceleration detecting unit.

15. The control apparatus according to claim 1, wherein:
    the shift control unit drives the actuator apparatus so as to release the lock on the power transmission mechanism by the lock mechanism based on an elapse of a predetermined delay time from start of the torque correction control.

16. The control apparatus according to claim 15, wherein:
the shift control unit controls, in response to the vehicle being determined to be positioned on an uphill road or a downhill road, the actuator apparatus so as to release the lock on the power transmission mechanism by the lock mechanism based on the elapse of the predetermined delay time from the start of torque correction control.

17. The control apparatus according to claim 15, wherein:
the predetermined delay time is set based on the correction amount of the output torque of the electric motor.

18. A non-transitory computer-readable storage medium storing therein a program for controlling a vehicle that includes an electric motor that causes the vehicle to travel by transmitting torque to a wheel through a power transmission mechanism, a lock mechanism that is capable of switching between locking and releasing the lock on the power transmission mechanism, and an actuator apparatus that drives the lock mechanism, the program causing at least one processor to implement:
controlling the electric motor;
controlling a shift-by-wire system that is provided in the vehicle, the shift-by-wire system being capable of performing switching to shift ranges of the vehicle including a parking range and a non-parking range other than the parking range;
controlling a brake apparatus of the vehicle,
driving the actuator apparatus so as to release the lock on the power transmission mechanism by the lock mechanism based on the shift ranges of the shift-by-wire system being switched from the parking range to the non-parking range,
performing torque correction control in which an output torque of the electric motor is corrected such that a load that acts on the lock mechanism from the power transmission mechanism is reduced based on the shift ranges of the shift-by-wire system being switched from the parking range to the non-parking range, and
operating the brake apparatus and increasing a braking force of the brake apparatus to be greater than a braking force set based on depression of a brake pedal, during a period in which the torque correction control is performed.

\* \* \* \* \*